United States Patent Office 2,734,886
Patented Feb. 14, 1956

2,734,886

RUBBER TREATMENT

Kenneth W. Doak, Bloomfield, N. J., assignor to United States Rubber Company, New York, N. Y., a corporation of New Jersey No Drawing. Application August 31, 1954,
Serial No. 453,443

8 Claims. (Cl. 260—41.5)

This invention relates to improvements in the technique of processing mixtures of carbon black and high-unsaturation rubber prior to vulcanization thereof, and more particularly to improvements in so-called "low-hysteresis" processing of such mixtures.

The technique of processing mixtures of rubber and carbon black high in carbon black, prior to vulcanization thereof, whereby to obtain vulcanizates with improvements in physical and chemical properties, is described in Gerke et al. U. S. Patent 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

The improved vulcanizates of Gerke et al. are obtained by incorporating uniformly in the rubber a relatively large amount of carbon black, for example, at least 25 parts, and preferably in the case of tire treads at least 40 parts, by weight of carbon black per 100 parts by weight of rubber, and subjecting the mixture to a heat treatment at a temperature substantially above 250° F., the preferred temperature being in the range from about 300° F. to 370° F., and masticating the mix during and/or after such heat treatment, or alternately therewith. The duration of the special heat treatment varies with the temperature employed, the higher the temperature the shorter the time, and is governed also by the degree of change desired in the properties of the ultimate vulcanized product which properties are gauged to be compatible with its final use. In general, heat treatments of from 10 to 60 minutes' duration are said to be suitable for most purposes, particularly within the preferred temperature range.

The principal object of the present invention is to provide new chemical promoters for the processing of rubber and carbon black mixtures at relatively high temperatures, as in processes of the general type disclosed in the above-mentioned Gerke patent. Such processing is often referred to as low-hysteresis processing and is usually designed to produce high electrical resistance and low torsional hysteresis, particularly in rubber stocks used for the manufacture of pneumatic tires and more particularly tread stocks. A further object is to bring about a substantial reduction in the time of such processing by the use of the herein disclosed chemicals whereby an important increase in the capacity and output of the equipment is obtained with the result that such processing is rendered commercially feasible. Other objects and advantages of my invention will more fully hereinafter appear.

The present invention is based upon my discovery that certain solely aliphatic azo compounds substantially decrease the time and/or lower the temperature necessary for so-called low-hysteresis processing of mixtures of carbon black and high-unsaturation rubbers. In other words, the rate of the low-hysteresis processing reaction, at a given temperature, is materially increased by the presence of any of these azo compounds.

The process of my invention comprises mixing high-unsaturation rubber with a relatively large amount of a rubber-reinforcing carbon black and a relatively small amount of the aliphatic azo compound and heating this mixture at a temperature of from 275° to a temperature just short of that at which the rubber would be harmed by thermal decomposition, to bring about the desired changes in the rubber and carbon black mixture whereby a vulcanizate of this mixture will have a considerably reduced torsional hysteresis and a considerably increased electrical resistivity. This heat treatment is carried out in the absence of vulcanizing agents, e. g., sulfur or sulfur-yielding compounds. With the resulting heat-treated mixture there are then incorporated vulcanizing ingredients, almost invariably including sulfur, and any other desired compounding ingredients including conventional accelerators and the like, these being intimately incorporated in any suitable way after which the mixture is shaped and vulcanized in the usual way.

Any carbon black which is capable of reinforcing the rubber can be used in the practice of my invention. We generally employ either furnace black or channel black. It will be understood that the particular type of carbon black will generally be selected with reference to the particular rubber used, this being a matter well within the skill of the art. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can range as high as 100 parts per 100 parts of rubber.

My invention can be practiced with any sulfur-vulcanizable, high-unsaturation, aliphatic conjugated diolefin polymer rubber, including natural rubber, i. e., Hevea rubber, and those synthetic rubbers which are homopolymers or copolymers of aliphatic conjugated diolefin hydrocarbons, examples being synthetic rubbery polybutadiene and polyisoprene, and copolymers of butadiene or like diolefin hydrocarbon with other ethylenically unsaturated copolymerizable monomeric compounds, e. g. copolymers of butadiene with styrene, alpha-methylstyrene acrylonitrile, monovinylpyridines, ethyl acrylate, methyl vinyl ketone, methyl isopropenyl ketone, methyl acrylate, and methyl methacrylate. By "high-unsaturation" I mean containing at least 25% of combined aliphatic conjugated diolefin hydrocarbon. My invention can be practiced with a single rubber or with a blend of two or more rubbers of the foregoing type.

The solely aliphatic azo compounds used in the practice of my invention are those which contain, bonded to each nitrogen of the —N=N— group, a discrete aliphatic carbon atom which also has bonded to it a cyano group, an alkyl group having 1–5 carbon atoms, and a substituent selected from H, methyl and ethyl. Usually the azo compound selected is symmetrical, preferably being one of the dialkyl dimethyl compounds having the formula

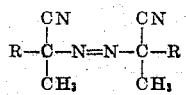

where R is an alkyl group containing from 1 to 5 carbon atoms.

Specific examples of the aliphatic azo compounds which can be used are alpha, alpha'-azobis-isobutyronitrile (commercially known as "Porofor–N"), alpha,alpha'-azobis-(2-methyl-butyronitrile), alpha,alpha'-azobis - (2-methylheptanonitrile), alpha,alpha' - azobis-(alpha,gamma,gamma-trimethylvaleronitrile), alpha,alpha' - azobis-(alpha-ethylbutyronitrile), and alpha,alpha'-azobis-propionitrile.

I prefer to employ the azo compound in amount equal to from 1 to 5 parts per 100 parts of the rubber. Amounts in this range so speed up the attainment of the desired effects of the heat treatment as to be important commercially. Amounts less than 1 part can be used but do not accelerate the action of the heat treatment to a useful degree. Amounts greater than 5 parts can be used but are uneconomical.

The azo compound should be incorporated with the rubber and carbon black at relatively low temperature, typically not over 250° F., to avoid premature decomposition of the azo compound to any substantial extent and to avoid premature reaction of the azo compound with the rubber. Such premature decomposition or reaction of the azo compound would lessen the efficiency and effectiveness of the treatment.

Although azo compounds of the type used in my invention are known to decompose slowly at temperatures as low as about 100° F., the decomposition is not too rapid to prevent their being incorporated into the rubber and carbon black mixture at temperatures of 175–250° F.

In the preferred practice of my invention, the heat treatment of the mixture of rubber, carbon black and organic azo compound is carried out by mastication, with any suitable type of masticating equipment such as an open two-roll rubber mill or more preferably an internal rubber mixer, especially a Banbury mixer. A Banbury mixer is particularly advantageous because it exerts a severe masticatory action upon the charge and because it conserves the heat generated by the mixing action, and this heat greatly aids in elevating the temperature of the stock to and maintaining it within the desired range. Depending upon the size and operating speed of the Banbury mixer, and other factors, extraneous heat may or may not need to be applied to bring the stock temperature within the desired temperature range and hold it there. In some cases it may be necessary to apply extraneous cooling to keep the stock temperature from rising above the desired level.

The optimum duration of the preferred masticatory heat treatment may vary widely depending upon many factors including the temperature of the heat treatment, type of mixer, specific organic azo compound used, amount of organic azo compound, etc. In any case it will be considerably shorter, under like temperature conditions, than the time required when the promoter is omitted. Times of the order of 5 to 20 minutes will generally be adequate for the purposes of my invention.

The preferred temperature for the heat treatment is 275–375° F. The specific temperature used should be selected with reference to the decomposition characteristics of the particular organic azo compound being used. For example, in the case of an azo compound which does not decompose with rapidity (in not over 20 minutes) at temperatures below 325° F., the heat treatment should be conducted at 325° F. or higher in order to insure maximum utilization of the promoting capabilities of the azo compound in a reasonably short period of time.

Very good results are achieved by mastication at 275–375° F. for times of from 5 to 20 minutes. Generally speaking the shorter times are used at the higher temperatures in this range. In other words, time and temperature are inversely co-related.

It is often highly desirable to have other materials present during the heat treatment. Thus a part or all of the stearic acid commonly incorporated prior to final vulcanization may be present during the heat treatment; the amount of stearic acid present may range from 0.5 to 5 parts per 100 of rubber; the amount added later for vulcanization can be reduced by a like amount.

If desired, a hydrocarbon oil of the type commonly used as a rubber softener or extender may be present during the heat treatment. The amount of oil so present may range from 5 to 50 parts per 100 of rubber. The amount will depend on the type of rubber. Thus, in the case of a very high viscosity butadiene-styrene rubbery copolymer, having an ML-4 Mooney viscosity at 212° F. of 100 or more, which would normally be extended with large amounts of oil to make for ready processability, I often incorporate from 30 to 50 parts of oil in the mixture subjected to heat treatment. In the case of rubbers of normal viscosity, smaller amounts of oil, say from 5 to 10 parts will be present during the heat treatment.

The process of my invention comprises the following essential steps:

1. Mixing thoroughly the rubber and the carbon black, and then mixing in the aliphatic azo compound by ordinary technique at a relatively low temperature at which the azo compound does not substantially decompose or react in the time required to obtain a good mixture.

2. Heat-treating the resulting mixture, either by mastication or static treatment, at a temperature at which the azo compound decomposes rapidly and for a time sufficiently long to substantially decompose it.

3. Masticating the mixture, either during or subsequent to the heat-treating step, or alternately therewith. In the case of static heat treatment, this mastication may be performed incidentally to the later incorporation of vulcanizing and other compounding ingredients, i. e., during step 4.

4. Incorporating vulcanizing and other ingredients at a temperature sufficiently low to preclude vulcanization.

5. Shaping.

6. Vulcanizing the shaped mixture.

It will be understood that the processing is controlled within limits avoiding serious degradation of the rubber, it being known that either excessive milling of rubber in air or excessive heating of rubber at elevated temperatures tends to break down or degrade the rubber molecules. Rubber vulcanizates made from degraded rubber have unusually low tensile strength and poor resistance to tear. In practicing my invention, the tensile strength of the vulcanizates need not be lowered more than 10% by the heat-treating step.

The following examples illustrate the preferred method of practicing my invention. All parts expressed herein are by weight.

*Example 1*

A master batch of 100 parts of natural rubber and 50 parts of a medium processing channel black (called "Spheron 6") is prepared in a conventional manner. To this mixture is added 1.5 parts of alpha,alpha'-azobis-isobutyronitrile at about 225° F. The mixture is then masticated 10 minutes on a mill with a stock temperature of 300–310° F. Thereafter, vulcanizing ingredients are added at about 200° F. (5 parts of stearic acid, 2 parts of zinc oxide, 2 parts of pine tar, 1 part of antioxidant, 1 part of accelerator, and 2.6 parts of sulfur). The stock is vulcanized for 45 minutes at 287° F. A control is prepared in an identical manner, except that no azo compound is added. Electrical resistivity and torsional hysteresis are measured, with the following results:

| Sample | ML-4 (212° F.) | Log Resistivity | Tors. Hyst., 280° F. |
| --- | --- | --- | --- |
| Control | 38 | 9.1 | 0.112 |
| Stock with alpha,alpha'-azobis-isobutyronitrile | 30 | 10.7 | .090 |

The practice of the invention has increased the specific electrical resistivity, and has reduced the torsional hysteresis by about 20%.

*Example 2*

A master batch of 100 parts of a butadiene-styrene copolymer (GR-S polymerized at 41° F.), 52 parts of a channel black ("Spheron 6"), 6 parts of hydrocarbon oil, and one part of stearic acid is prepared in a conventional manner. To this is added 2.5 parts of alpha,alpha'-azobis-isobutyronitrile at about 225° F. The mixture is then masticated for 8 minutes at 325° F. Vulcanizing agents (3 parts of zinc oxide, 2 parts of sulfur, and a suitable accelerator) are mixed into the stock at about 200° F. The stock is then vulcanized 45 minutes at 293° F. A control receives the same treatment except that no promoter is used. The following results are obtained:

| Sample | ML–4 (212° F.) | Log Resistivity | Tors. Hyst., 280° F. |
|---|---|---|---|
| Control | 71 | 7.7 | 0.184 |
| Stock with alpha,alpha'-azobis-isobutyronitrile | 93 | 10.3 | .129 |

*Example 3*

An experiment is carried out with a rubbery butadiene-acrylonitrile copolymer (containing 18–20% combined butadiene and 82–80% combined acrylonitrile, having a Mooney viscosity of 50–60 and called "Paracril AJ") formulation containing 100 parts of the rubbery copolymer, 50 parts of channel black (MPC), 6 parts of hydrocarbon softener, 1 part of stearic acid, and 2.5 parts of alpha,alpha'-azobis-isobutyronitrile which was incorporated at about 225° F. Heat treatment is for 8 minutes at 325° F. The following results are obtained on the vulcanized stocks:

| Sample | Log Resistivity | Tors. Hyst., 280° F. |
|---|---|---|
| Control | 8.0 | 0.157 |
| Stock with alpha,alpha'-azobis-isobutyronitrile | 9.7 | .125 |

*Example 4*

An experiment is carried out with a high viscosity (ML–4 viscosity at 212° F. of about 130) butadiene-styrene copolymer containing (per 100 of rubber) 37.5 parts of hydrocarbon oil, 72 parts of channel black ("Spheron 6"), and 3.0 parts of alpha,alpha'-azobis-isobutyronitrile. Heat treatment is for 8 minutes at 325° F. A control stock containing no promoter was heat treated for 15 minutes at 350° F. A second portion of control stock had no heat treatment. The following results were obtained on the vulcanized stocks:

| Sample | ML–4 (212° F.) | Log Resistivity | Tors. Hyst., 280° F. |
|---|---|---|---|
| Control (15' at 350° F.) | 69 | 8.3 | 0.156 |
| Stock with alpha,alpha'-azobis-isobutyronitrile | 62 | 8.3 | .151 |
| Stock without heat treatment | 70 | 6.7 | .238 |

The use of the promoter for 8 minutes at 325° F. gives a result equivalent to that obtained in 15 minutes at 350° F. in the absence of promoter, showing the reduction of time and temperature obtained by the practice of the invention.

Although I have disclosed my invention with particular emphasis upon the preferred practice wherein the heat treatment is accompanied with mastication, nevertheless my invention can be practiced by carrying out the heat treatment under static conditions. For example, I may form an intimate mixture of the rubber, carbon black and the organic azo compound in any suitable manner and then heat this mixture at a temperature of from 275° F. to a point just short of the point of thermal injury to the rubber without simultaneous mastication, the heat-treated mixture being subsequently masticated and compounded with conventional compounding and vulcanizing ingredients. The static heat treatment can be conducted by placing slabs of the stock in an oven heated to a suitable temperature, or slabs of the stock can be stacked and allowed to stand for several hours, preferably under relatively non-heat-conductive conditions in order to maintain the stock at the high temperature for as long as reasonably possible. It may be desirable to surround the slabs of hot stock with a heat-insulating blanket of any suitable type in order that the residual heat of the slabs may be retained as long as possible.

Static heat treatment has the advantage of releasing the milling or Banbury equipment from use for carrying out the heat treatment of my invention, and this may be highly desirable under some conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (in ohm-cms.) is designated "Log Resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further details of this test see Gerke et al. 2,118,601.

Having thus described my invention, what I claim and desire to protect by Letters Patent is:

1. A process which comprises mixing a sulfur-vulcanizable conjugated diolefin polymer rubber containing at least 25% of combined aliphatic conjugated diolefin hydrocarbon with a relatively large amount of a rubber-reinforcing carbon black and a relatively small amount of a solely aliphatic azo compound having bonded to each nitrogen of the azo group a discrete aliphatic carbon atom which has bonded to it a cyano group, an alkyl group with 1–5 carbon atoms, and a substituent selected from the group consisting of hydrogen, methyl, and ethyl, heating the mixture at a temperature of from 275° F. to a point just short of that at which the rubber would be harmed by thermal decomposition, for a time sufficient to substantially lower the torsional hysteresis and substantially increase the electrical resistivity of a vulcanizate of the resulting mixture, masticating the mixture and completing the incorporation of vulcanizing and other desired ingredients, shaping the mass, and vulcnizing the resulting shaped mass.

2. A process which comprises mixing a sulfur-vulcanizable conjugated diolefin polymer rubber containing at least 25% of combined aliphatic conjugated diolefin hydrocarbon with a realtively large amount of a rubber-reinforcing carbon black and a relatively small amount of a solely aliphatic azo compound having bonded to each nitrogen of the azo group a discrete aliphatic carbon atom which has bonded to it a cyano group, an alkyl group with 1–5 carbon atoms, and a substituent selected from the group consisting of hydrogen, methyl, and ethyl, masticating the mixture at a temperature of from 275° F. to 375° F., thereafter incorporating vulcanizing and other desired ingredients, shaping the mass, and vulcanizing the resulting shaped mass.

3. A process which comprises mixing natural rubber with a relatively large amount of a rubber-reinforcing carbon black and from 1 to 5 parts, per 100 parts of said rubber, of a solely aliphatic azo compound having bonded to each nitrogen of the azo group a discrete aliphatic carbon atom which has bonded to it a cyano group, an alkyl group with 1–5 carbon atoms, and a substituent selected from the group consisting of hydrogen, methyl, and ethyl, masticating the mixture at a temperature of from 275° F. to 375° F., thereafter incorporating vulcanizing and other desired ingredients, shaping the mass, and vulcanizing the resulting shaped mass.

4. A process which comprises mixing a butadiene-styrene rubbery copolymer with a relatively large amount of a rubber-reinforcing carbon black and from 1 to 5 parts, per 100 parts of said copolymer, of a solely aliphatic azo compound having bonded to each nitrogen of the azo group a discrete aliphatic carbon atom which has bonded to it a cyano group, an alkyl group with 1–5 carbon atoms, and a substituent selected from the group consisting of hydrogen, methyl, and ethyl, masticating the mixture at a temperature of from 275° F. to 375° F., thereafter incorporating vulcanizing and other desired ingredients, shaping the mass, and vulcanizing the resulting shaped mass.

5. A process which comprises mixing a butadiene-acrylonitrile rubbery copolymer with a relatively large amount of a rubber-reinforcing carbon black and from 1 to 5 parts, per 100 parts of said copolymer, of a solely aliphatic azo compound having bonded to each nitrogen of the azo group a discrete aliphatic carbon atom which has bonded to it a cyano group, an alkyl group with 1–5 carbon atoms, and a substituent selected from the group consisting of hydrogen, methyl, and ethyl, masticating the mixture at a temperature of from 275° F. to 375° F., thereafter incorporating vulcanizing and other desired ingredients, shaping the mass, and vulcanizing the resulting shaped mass.

6. A process which comprises mixing natural rubber with a relatively large amount of a rubber-reinforcing carbon black, and from 1 to 5 parts of alpha,alpha'-azobis-isobutyronitrile per 100 parts of said rubber, masticating the mixture at a temperature of from 275° F. to 375° F., thereafter incorporating vulcanizing and other desired ingredients, shaping the mass, and vulcanizing the resulting shaped mass.

7. A process which comprises mixing a butadiene-styrene rubbery copolymer with a relatively large amount of a rubber-reinforcing carbon black, and from 1 to 5 parts of alpha,alpha'-azobis-isobutyronitrile per 100 parts of said copolymer, masticating the mixture at a temperature of from 275° to 375° F., thereafter incorporating vulcanizing and other desired ingredients, shaping the mass, and vulcanizing the resulting shaped mass.

8. A process which comprises mixing a butadiene-acrylonitrile rubbery copolymer with a relatively large amount of a rubber-reinforcing carbon black, and from 1 to 5 parts of alpha,alpha'-azobis-isobutyronitrile per 100 parts of said copolymer, masticating the mixture at a temperature of from 275° F. to 375° F., thereafter incorporating vulcanizing and other desired ingredients, shaping the mass, and vulcanizing the resulting shaped mass.

No references cited.